US006100631A

United States Patent [19]

Misono

[11] Patent Number: 6,100,631

[45] Date of Patent: Aug. 8, 2000

[54] COLOR CATHODE RAY TUBE HAVING IMPROVED REDUCTION

[75] Inventor: Masayoshi Misono, Chousei-gun, Japan

[73] Assignee: Hitachi, Ltd., Tokyo, Japan

[21] Appl. No.: 09/421,501

[22] Filed: Oct. 20, 1999

Related U.S. Application Data

[63] Continuation of application No. 09/281,814, Mar. 31, 1999, Pat. No. 6,011,348, which is a continuation of application No. 08/820,308, Mar. 18, 1997, Pat. No. 5,898,260.

[30] Foreign Application Priority Data

Mar. 19, 1996 [JP] Japan .................................... 8-63098

[51] Int. Cl.[7] ................................................ G01J 29/50

[52] U.S. Cl. ......................... 313/414; 313/412; 313/426; 313/427

[58] Field of Search .................................. 313/412, 414, 313/426, 427

[56] References Cited

U.S. PATENT DOCUMENTS

| | | |
|---|---|---|
| 3,852,608 | 12/1974 | Johanns et al. . |
| 3,952,224 | 4/1976 | Evans, Jr. . |
| 4,599,534 | 7/1986 | Shirai et al. . |
| 4,898,556 | 2/1990 | Day . |
| 5,013,963 | 5/1991 | Ikegami et al. . |
| 5,034,653 | 7/1991 | Cho et al. . |
| 5,461,278 | 10/1995 | Misono et al. . |
| 5,635,792 | 6/1997 | Jung et al. . |
| 5,710,479 | 1/1998 | Adriaanse et al. . |

FOREIGN PATENT DOCUMENTS

| | | |
|---|---|---|
| 51-64368 | 6/1976 | Japan . |
| 53-18866 | 6/1978 | Japan . |
| 57-151153 | 9/1982 | Japan . |
| 60-81736 | 5/1985 | Japan . |
| 4-10693 | 2/1992 | Japan . |
| 7005233 | 4/1970 | Netherlands . |

*Primary Examiner*—Vip Patel
*Attorney, Agent, or Firm*—Antonelli, Terry, Stout & Kraus, LLP

[57] ABSTRACT

A color cathode ray tube includes an electron gun for generating and focusing three in-line electron beams, and a pair of electrodes disposed down stream of a pre-focus lens and forming a final main lens. Each of the pair of electrodes have a common single opening for the three in-line electron beams in an end thereof opposing another of the pair of electrodes. A shield cup is fixed to a final electrode of the electron gun and has applied thereto the same potential which is applied the final electrode, the shield cup having a single aperture common to the three in-line electron beams. A focusing action of the pre-focus lens and a focusing action of the main lens are different between a center electron beam and a side electron beam of said three in-line electron beams, respectively.

20 Claims, 16 Drawing Sheets

COLOR CATHODE RAY TUBE HAVING IMPROVED REDUCTION

CROSS REFERENCE TO RELATED APPLICATION

This is a continuation of U.S. application Ser. No. 09/281,814, filed Mar. 31, 1999, now U.S. Pat. No. 6,011,348 which is a continuation of U.S. application Ser. No. 08/820,308, filed Mar. 18, 1997, now U.S. Pat. No. 5,898,260, the subject matter of which is incorporated by reference herein.

BACKGROUND OF THE INVENTION

The present invention relates to a color cathode ray tube, and particularly to a color cathode ray tube including an electron gun which is improved in resolution by enhancing focus characteristics over the entire phosphor screen and over the entire electron beam current region.

A color cathode ray tube used as TV picture tubes or monitor tubes at information terminals contains an electron gun for emitting a plurality (in general, three) of electron beams at one end of an evacuated envelope, a phosphor screen coated with a phosphor film of a plurality (in general, three) of colors on the inner surface of the other end of the evacuated envelope, and a shadow mask serving as a color selection electrode closely spaced from the phosphor screen, wherein a plurality of electron beams emitted from the electron gun are two-dimensionally scanned by magnetic fields generated by a deflection yoke provided outside the evacuated envelope, to produce a desired image.

FIG. 12 is a sectional view illustrating a configuration example of a color cathode ray tube to which the present invention is applied. In FIG. 12, reference numeral 21 indicates a panel portion; 22 is a funnel portion; 23 is a neck portion; 24 is a phosphor film; 25 is a shadow mask; 26 is a mask frame; 27 is a magnetic shield; 28 is a shadow mask suspension mechanism; 29 is an in-line electron gun; 30 is a deflection device; 31 is a beam adjustment device; 32 is an internal conductive coating; 33 is a tension band; 34 is a stem pin; and 35 is a getter.

In this color cathode ray tube, an evacuated envelope is formed of the panel portion 21, the neck portion 23, and the funnel portion 22 connecting the panel portion 21 to the neck portion 23.

The panel portion 21 has on the inner surface thereof a display screen composed of the phosphor film 24 coated with phosphors of three colors. The neck portion 23 contains the electron gun 29 for emitting three in-line electron beams. The shadow mask 25 having a multiplicity of apertures therein or a parallel array of narrow stripes is spaced closely to the phosphor film 24 of the panel portion 21.

In addition, characters Bc, Bs indicate electron beams. The deflection device 30 is mounted in a transition region between the funnel portion 22 and the neck portion 23.

The getter 35 is supported at the end of a getter support spring with its one end fixed on a shield cup of the electron gun 29 for increasing the degree of vacuum in the evacuated envelope by evaporating and dispersing a getter material in the evacuated envelope. The getter 35 is welded to the shield cup during assembling of the electron gun.

The three electron beams emitted from the electron gun 29 are deflected in the horizontal and vertical directions by vertical and horizontal deflection magnetic fields generated by the deflection device 30, are subjected to color selection through electron beam apertures in the shadow mask 25, and then impinge on respective phosphors, to produce a color image on the phosphor film 24.

FIGS. 13A and 13B are schematic side views illustrating configuration examples of in-line type electron guns to be incorporated in the color cathode ray tube shown in FIG. 12, wherein FIG. 13A shows a so-called uni-potential type electron gun, and FIG. 13B shows a so-called bi-potential electron gun.

In FIG. 13A, reference character K indicates a cathode; 1 is a first grid (hereinafter, referred to as "G1 grid", and the same rule applies correspondingly to the following); 2 is a G2 electrode; 3 is a G3 electrode; 4 is a G4 electrode; 5 is a G5 electrode; 6 is a G6 electrode; 7 is a shield cup; 8 is a stem; and 9 is a beading glass In this electron gun, the facing ends of the G4 electrode 4 and the G5 electrode 5 form a pre-main lens, and the facing ends of the G5 electrode 5 and G6 electrode 6 form a main lens.

In FIG. 13B. reference character K indicates a cathode; 1 is a G1 electrode; 2 is a G2 electrode; 103 is a G3 electrode; 104 is a G4 electrode; 7 is a shield cup; 8 is a stem; and 9 is a beading glass. In this electron gun, the facing ends of the G3 electrode 103 and the G4 electrode 104 form a main lens.

For a color cathode ray tube including at least an electron gun composed of a plurality of electrodes for accelerating and focusing three in-line electron beams, a deflection device for deflecting the electron beams in the horizontal and vertical directions, and a phosphor screen composed of a phosphor film which luminesces when the electron beams impinge thereon, various improvements have been made to obtain a desired reproduced image on the phosphor screen over the region extending from the center to the peripheral portions.

For example, Japanese Patent Publication No. Sho 53-18866 discloses a color cathode ray tube in which an astigmatic lens is provided in a lens region formed by a G2 electrode and a G3 electrode; Japanese Patent Laid-open No. Sho 51-64368 discloses a color cathode ray tube in which each of electron beam apertures in a G1 electrode and a G2 electrode of an in-line three-beam type electron gun is vertically elongated, the shapes of the electrodes are different from each other, and the ellipticity of the center beam electron beam aperture is smaller than that of the side electron beam aperture; Japanese Patent Laid-open No. 60-81736 discloses a color cathode ray tube in which at least one non-axially symmetric lens is formed of slits provided in a G3 electrode of an in-line type electron gun on the cathode side, the depth of the slit along the tube axis being larger for the center electron beam than the depth of the slit for the side electron beam, wherein electron beams are made to impinge on a phosphor screen via the nonaxially-symmetric lens; and Japanese Patent Laid-open No. Sho 57-151153 discloses a color cathode ray tube in which three apertures corresponding to three electron guns in a first grid electrode or a second grid electrode are configured that the areas thereof are equal to each other, and the diameter of the side beam apertures (side electron guns) is larger than that of the center beam aperture (a center electron gun) in the direction perpendicular to the in-line direction of the three beams.

The focus characteristics required of an in-line three-beam color cathode ray tube are improvement in resolution of images formed by three electron beams over the entire phosphor screen and over the entire electron beam current region in consideration of the luminous efficiency and luminosity factor of phosphors of three colors.

The design of an in-line electron gun capable of satisfying such requirements requires a high level technique.

To meet the above-described requirements of an in-line three-beam color cathode ray tube, the focus characteristics of three electron beams are required to be based on a good balance of the diameter of a main lens, the spherical aberration of a prefocus lens system, astigmatism correction, effects of an electron beam control portion, and the like. Also it is known that the diameter of a main lens is desired to be larger for improving the focus characteristics.

Furthermore, if the diameters of main lenses for three electron beams are to be increased as much as possible in a neck portion of a given diameter of a cathode ray tube, part of electric fields of the main lenses should be shared by the three electron beams, so that it becomes difficult to equalize the diameter of the main lens of a center electron gun to the diameter of the main lens of the side electron guns.

SUMMARY OF THE INVENTION

An object of the present invention is to provide a color cathode ray tube including an electron gun which is improved in resolution by enhancing focus characteristics over the entire phosphor screen and over the entire electron beam current region.

The cathode ray tube of the present invention is configured such that apertures of electrodes constituting a center electron gun are made to be different from the structures of the electrodes constituting side electron guns, and an action given to an electron beam passing through the center electron gun is made to be different from an action given to an electron beam passing through the side electron gun.

According to one preferred embodiment, there is provided a color cathode ray tube including: an electron gun composed of a plurality of electrodes including a cathode, a first grid electrode, and a second grid electrode arranged in this order for generating and focusing three in-line electron beams; a deflection device for deflecting the three electron beams in the horizontal and vertical directions; and a phosphor screen which luminesces when the three electron beams impinge thereon; wherein a pair of electrodes of the plurality of electrodes form a final main lens between single openings provided in opposing ends of the pair of electrodes, each of the single openings is common to the three in-line electron beams, and a size of an aperture for a center electron beam of the three in-line electron beams in at least one of the first grid electrode and the second grid electrode is smaller than that of an aperture for a side electron beam of the three in-line electron beams in the at least one of the first grid electrode and the second grid electrode.

BRIEF DESCRIPTION OF THE DRAWINGS

In the drawings, which form an integral part of the specification and are to be read in conjunction therewith, and in which like reference numerals designate similar components throughout the figures, and in which:

FIGS. 1A and 1B are schematic views, in representation of equivalent light-optical systems, of one configuration example of an in-line electron gun used for a color cathode ray tube of the present invention, wherein FIG. 1A shows a center electron gun, and FIG. 1B shows a side electron gun;

FIGS. 2A and 2B are schematic views, in representation of equivalent light-optical systems, of another configuration example of an in-line electron gun used for the color cathode ray tube of the present invention, wherein FIG. 2A shows a center electron gun, and FIG. 2B shows a side electron gun;

FIGS. 3A and 3B are views illustrating a first example of the shapes of electron beam apertures in a G1 electrode and a G2 electrode of an in-line electron gun used for the color cathode ray tube of the present invention, wherein FIG. 3A is for the G1 electrode, and FIG. 3B is for the G2 electrode.

FIGS. 4A and 4B are views illustrating a second example of the shapes of electron beam apertures in a G1 electrode and a G2 electrode of an in-line electron gun used for the color cathode ray tube of the present invention, wherein FIG. 4A is for the G1 electrode, and FIG. 4B is for the G2 electrode.

FIGS. 5A and 5B are views illustrating a third example of the shapes of electron beam apertures in a G1 electrode and a G2 electrode of an in-line electron gun used for the color cathode ray tube of the present invention, wherein FIG. 5A is for the G1 electrode, and FIG. 5B is for the G2 electrode.

FIGS. 6A and 6B are views illustrating a third example of the shapes of electron beam apertures in a G1 electrode and a G2 electrode of an in-line electron gun used for the color cathode ray tube of the present invention, wherein FIG. 6A is for the G1 electrode, and FIG. 6B is for the G2 electrode.

FIGS. 7A and 7B are views illustrating a configuration example of one of main lens-forming electrodes of an in-line electrode gun used for the color cathode ray tube of the present invention, wherein FIG. 7A is a front view of the electrode, and FIG. 7B is a partial cutaway side view of the electrode;

FIGS. 8A to 8C are views illustrating a configuration example of the other one of the main lens-forming electrodes of the in-line electron gun used for the color cathode ray tube of the present invention, wherein FIG. 8A is a front view of the electrode, FIG. 8B is a sectional view taken on line VIIIB—VIIIB of FIG. 8A; and FIG. 8C is a sectional view taken on line VIIIC—VIIIC of FIG. 8A;

DETAILED DESCRIPTION OF THE PREFERRED EMBODIMENTS

Hereinafter, preferred embodiments of the present invention will be described with reference to the accompanying drawings.

Figure 1A:
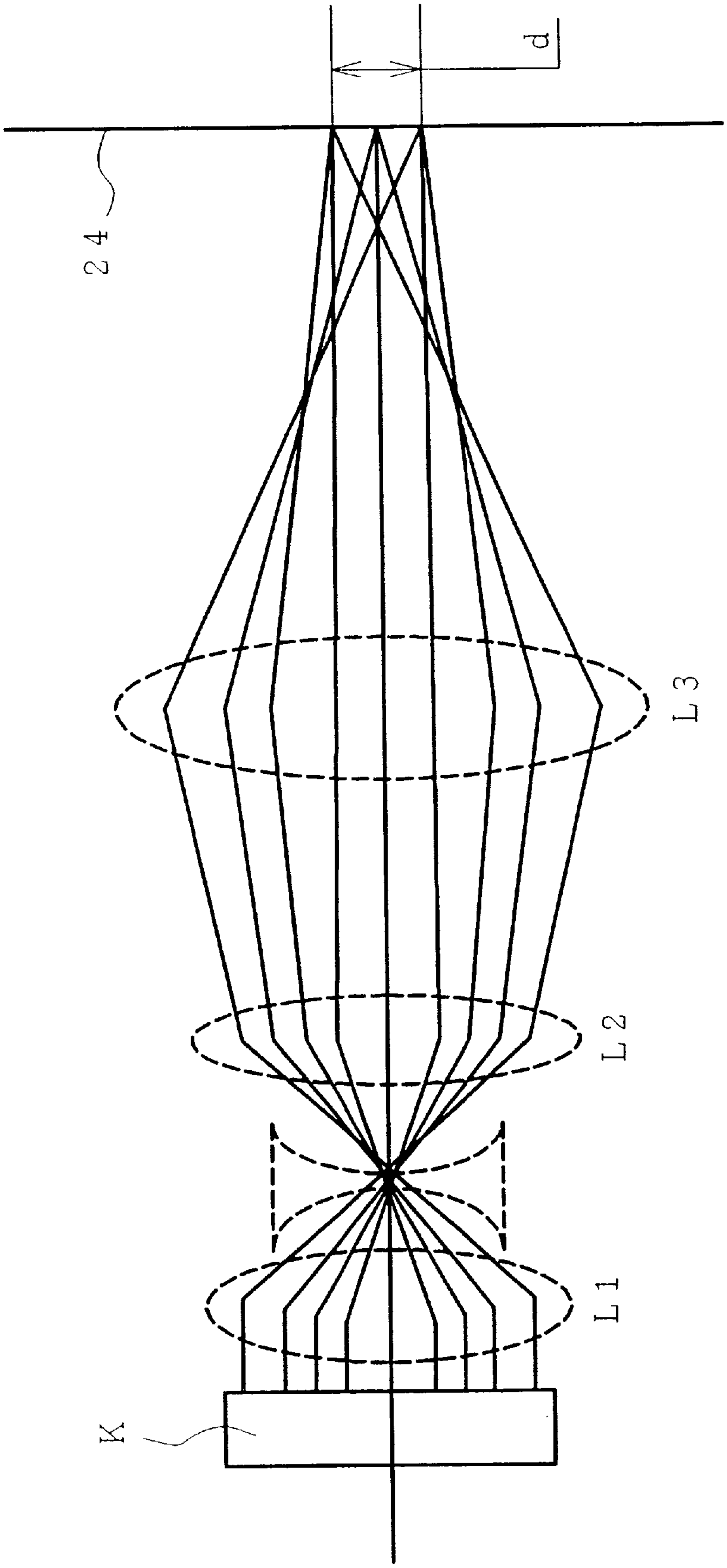
Figure 1B:
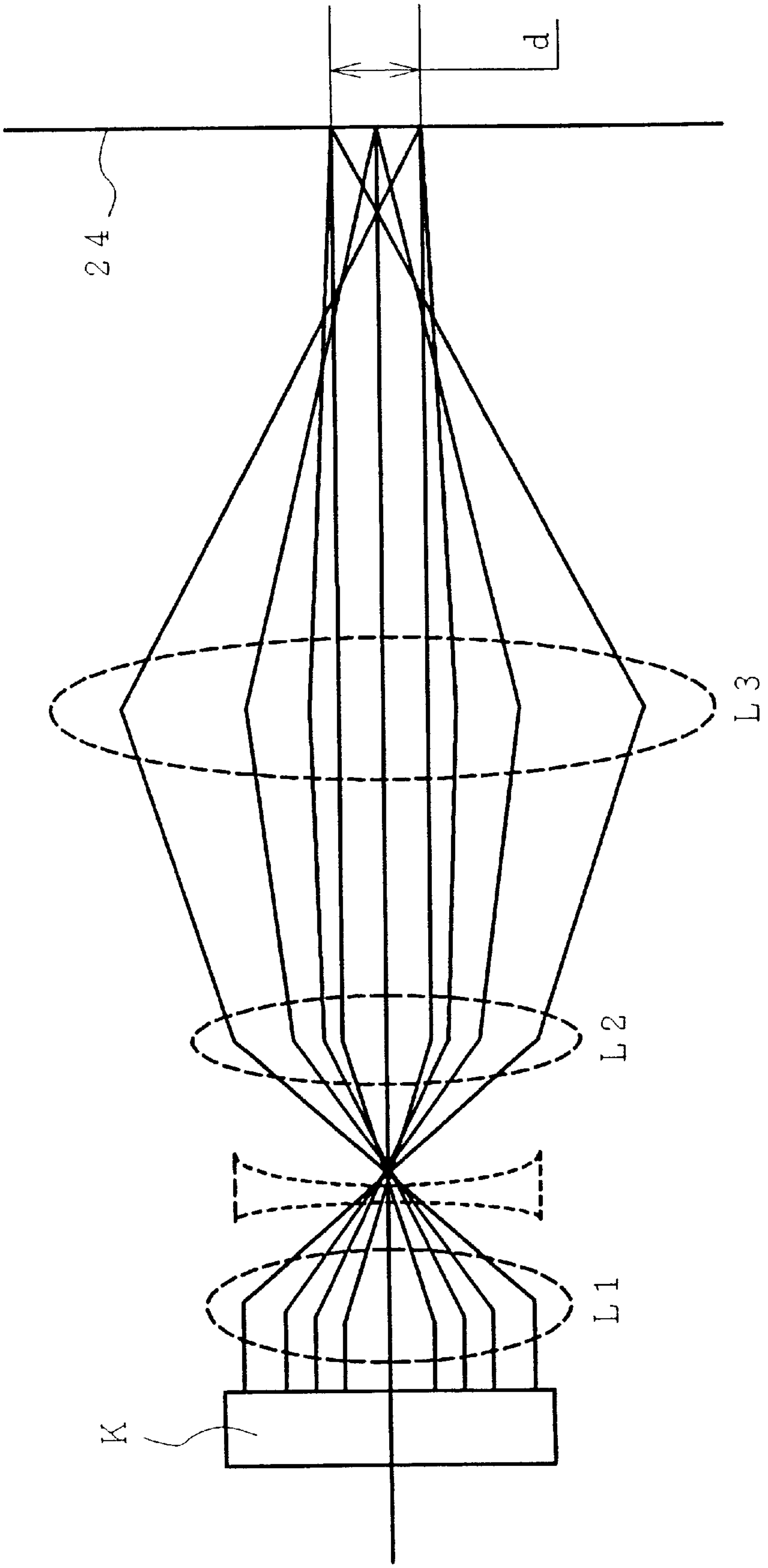

FIGS. 1A and 1B are schematic views in representation of equivalent light-optical systems, of one configuration example of an in-line electron gun used for a color cathode ray tube of the present invention, wherein FIG. 1A is for the center electron gun, and FIG. 1B is for the side electron gun.

The in-line electron gun shown in FIGS. 1A and 1B is of a so-called uni-potential type. As described with reference to FIG. 13A, this electron gun is composed of a cathode K, a G1 electrode 1, a G2 electrode 2, a G3 electrode 3, a G4 electrode 4, a G5 electrode 5, a G6 electrode 6, and a shield cup 7. Reference character L1 indicates a prefocus lens; L2 is a pre-main lens; L3 is a main lens; 24 is a phosphor screen, and d is a diameter of an electron beam spot on the phosphor screen.

As shown in FIGS. 1A and 1B, the electrons emitted from the cathode K are formed into an electron beam by the prefocus lens system L1 formed of the G1 electrode, G2 electrode and part of the G3 electrode, and the electron beams thus formed are focused by the pre-main lens L2 formed of part of the G3 electrode, G4 electrode, and part of the G5 electrode, and then are focused on the phosphor screen 24 by the main lens L3.

FIG. 1A shows that spherical aberration is small in the prefocus lens system L1 of the center electron gun, so that the density of electrons is high in a region apart from the center axis of the electron gun in the electron beam.

FIG. 1B shows that spherical aberration is larger in the prefocus lens system L1 of the side electron gun than that of the center electron gun shown in FIG. 1A, so that the density of electrons is low in a region apart from the center axis of the electron gun in the electron beams.

The pre-main lens L2 of the center electron gun shown in FIG. 1A has a spherical aberration nearly equal to that of the side electron gun shown in FIG. 1B.

The electron beams in the side electron gun shown in FIG. 1B pass through the main lens L3 having a diameter larger than that of the main lens L3 of the center electron gun shown in FIG. 1A and produce a bright spot on the phosphor screen 24. At this time, in the side electron gun, since the spherical aberration of the prefocus lens system L1 is larger than in the center electron gun shown in FIG. 1A, the loci of the electron rays passing through the main lens L3 are largely spread from the center axis of the electron gun as compared with the case of the center electron gun shown in FIG. 1A, and are largely influenced by the spherical aberration of the main lens L3, with a result that the electron rays passing through the loci apart from the center axis of the electron gun are rapidly focused. Also, in the side electron gun shown in FIG. 1B, since the density of the electrons passing through the vicinity of the center axis of the electron gun is higher than in the center electron gun of FIG. 1A, the space charge repulsion becomes nearly equal to that in the center electron gun shown in FIG. 1A. Eventually, the diameter d of the electron beam spot formed on the phosphor screen 24 by the side electron gun shown in FIG. 1B becomes nearly equal to that by the center electron gun shown in FIG. 1A.

In this way, according to this embodiment, the focusing actions of the prefocus lens system L1 and the main lens L3 on the center electron beams are made to be different from those on the side electron beams, so that the spot diameter "d" of the center electron beams can be equal to that of the side electron beams. This effect is obtained over to the entire phosphor screen, thereby improving the resolution over the entire screen.

Figure 2A:
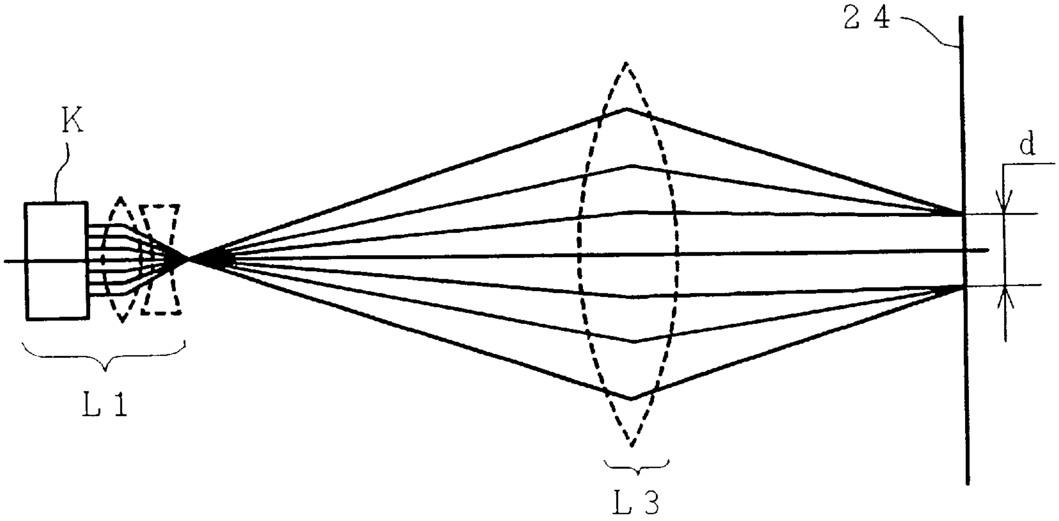
Figure 2B:
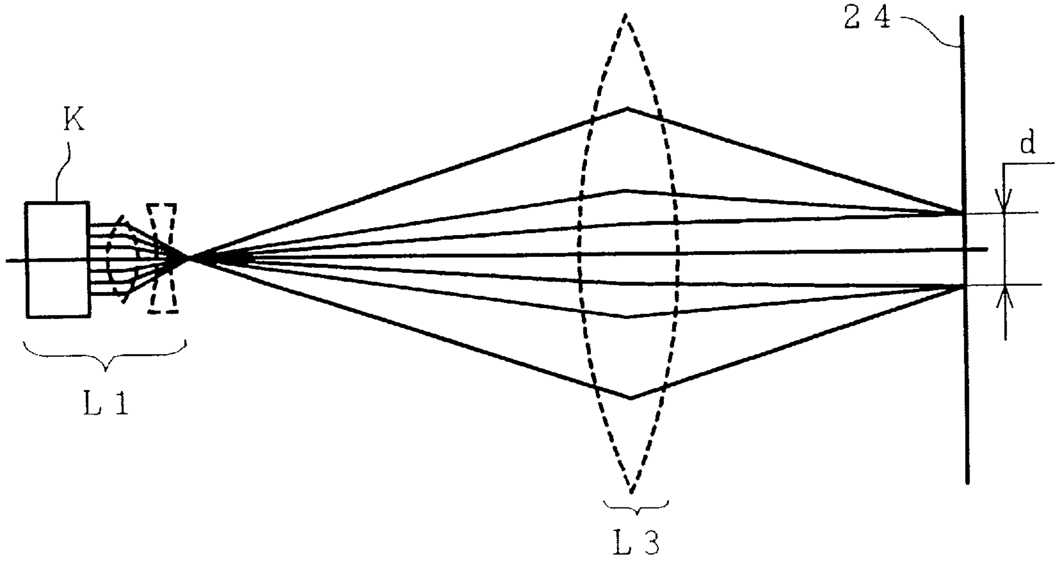

FIGS. 2A and 2B are schematic views, in representation of equivalent light-optical systems, of another configuration example of an in-line electron gun used for the color cathode ray tube of the present invention, wherein FIG. 2A is for the center electron gun, and FIG. 2B is for the side electron gun.

The in-line electron gun shown in FIGS. 2A and 2B is of a so-called bi-potential type. The electron gun includes a cathode K, a G1 electrode 1, a G2 electrode 2, a G3 electrode 103, a G4 electrode 104, and a shield cup 7. Reference character L1 indicates a prefocus lens; L3 is a main lens; 24 is a phosphor screen, and d is a diameter of an electron beam spot on the phosphor screen.

As shown in FIGS. 2A and 2B, electrons emitted from the cathode K is formed into an electron beam by the prefocus lens system L1 formed of the G1 electrode, G2 electrode and part of the G3 electrode, and then the electron beams thus formed are focused on the phosphor screen 24 by the main lens L3.

FIG. 2A shows that spherical aberration is small in the prefocus lens system L1 of the center electron gun so that the density of electrons is high in a region apart from the center axis of the electron gun, in the electron beam.

FIG. 2B shows that spherical aberration is larger in the prefocus lens system L1 of the side electron gun than that of the center electron gun shown in FIG. 2A, so that the density of electrons is low in a region apart from the center axis of the electron gun, in the electron beam.

The electron beam in the side electron gun shown in FIG. 2B pass through the main lens L3 having a diameter larger than that of the main lens L3 of the center electron gun shown in FIG. 2A and produce a bright spot on the phosphor screen 24. At this time, in the side electron gun, since the spherical aberration of the prefocus lens system L1 is larger than in the center electron gun shown in FIG. 2A, the loci of the electron rays passing through the main lens L3 are largely spread from the center axis of the electron gun as compared with the case of the center electron gun shown in FIG. 2A, and are largely influenced by the spherical aberration of the main lens L3, with a result that the electron ray s passing through the loci apart from the center axis of the electron gun are rapidly focused. Also, in the side electron gun shown in FIG. 2B, since the density of the electrons passing through the vicinity of the center axis of the electron gun is higher than in the center electron gun of FIG. 2A, the space charge repulsion becomes nearly equal to that in the center electron gun shown in FIG. 2A. Eventually, the diameter d of the electron beam spot formed on the phosphor screen 24 by the side electron gun shown in FIG. 2B becomes nearly equal to that by the center electron gun shown in FIG. 2A.

In this way, according to this embodiment, the focusing actions of the prefocus lens system L1 and the main lens L3 on the center electron beams are made to be different from those on the side electron beams, so that the spot diameter "d" of the center electron beams can be equal to that of the side electron beams. This effect is obtained over the entire phosphor screen, thereby improving the resolution over the entire screen.

The above relationship between the center electron beams and the side electron beams is retained irrespective of the amount of the electron beam current so that the resolution is improved over the entire electron beam current region.

Figure 3A:
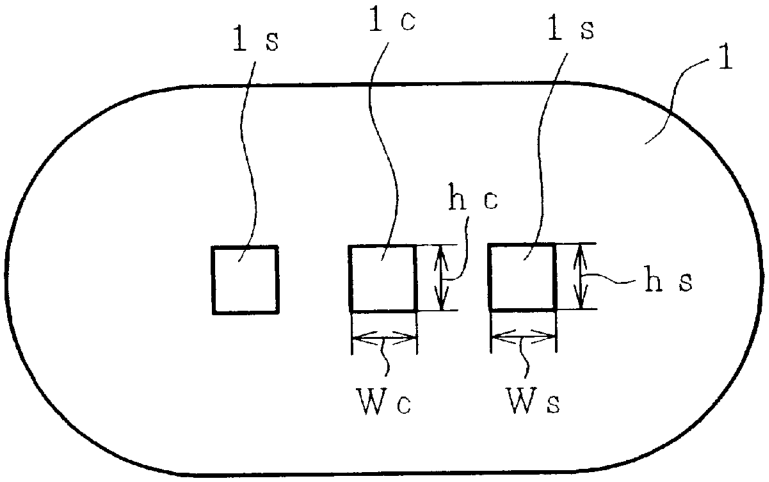
Figure 3B:
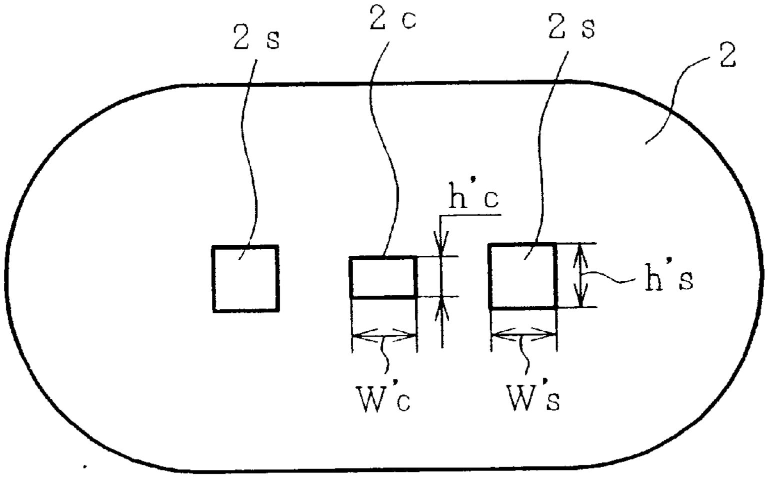

FIGS. 3A and 3B are schematic views illustrating a first example of the shapes of electron beam apertures in the G1 electrode 1 and the G2 electrode 2 of an in-line electron gun used for the color cathode ray tube of the present invention, wherein FIG. 3A is for the G1 electrode 1, and FIG. 3B is for the G2 electrode 2.

The G1 electrode 1 shown in FIG. 3A has three in-line electron beam apertures 1*s* (a side electron beam aperture for blue), 1*c* (a center electron beam aperture for green), and 1*s* (a side electron beam aperture for red). Each of these apertures is formed in the same rectangular shape of the same size. Namely, it is formed in the shape satisfying the relationship of wc=ws and hc=hs, where wc and ws indicate the lengths of the center and side electron beam apertures 1*c* and 1*s* in the in-line direction respectively, and hc and hs are the lengths thereof in the direction perpendicular to the in-line direction respectively). For example, wc=ws=hc=hs=0.6 mm.

The G2 electrode 2 shown in FIG. 3B has three in-line electron beam apertures 2*s* (a side electron beam aperture for blue), 2*c* (a center electron beam aperture for green), and 2*s* (a side electron beam aperture for red) Each of these electron beam apertures is also formed in a rectangular shape.

The length w'c of the center electron beam aperture 2*c* in the G2 electrode in the in-line direction is the same as the length w's of the side electron beam aperture in the in-line direction, and the length h'c of the center electron beam aperture in the direction perpendicular to the in-line direction is smaller than the length h's of the side electron beam aperture in the direction perpendicular to the in-line direction (w'c=w's, and h'c<h's). For example, the lengths of w'c, w's, h'c, h's can be set as follows: (w'c=w's=0.6 mm, h'c=0.55 mm, and h's=0.6 mm). The focusing characteristics shown in FIGS. 1A, 1B or FIGS. 2A, 2B can be obtained by forming the electron beam apertures in the G1 and G2 electrodes as described above.

Figure 3C:
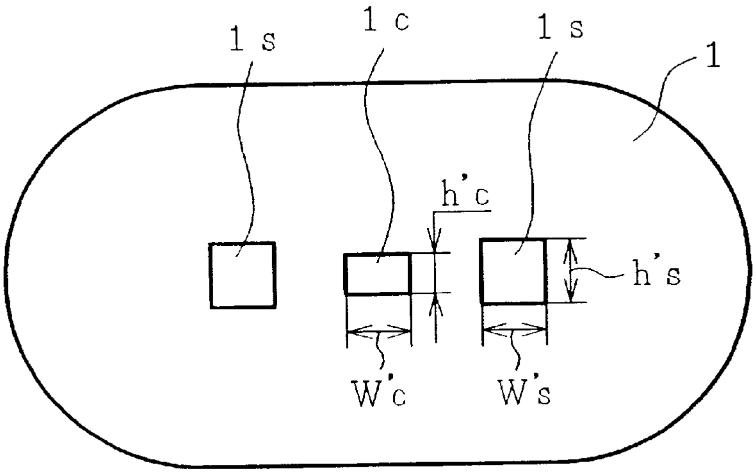
FIGS. 3C and 3D are views similar to FIGS. 3A and 3B, illustrating an example in which the relationship of the shapes of electron beam apertures shown in FIGS. 3A and 3B is reversed.
Figure 3D:
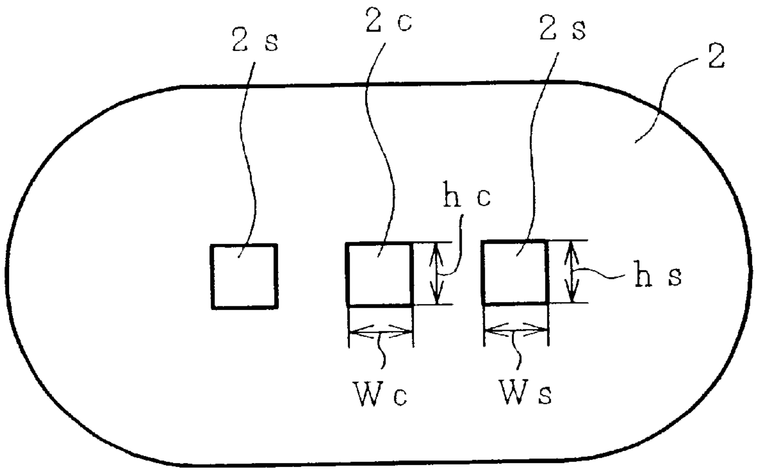

In addition, the same effect can be obtained by reversing the relationship between the G1 electrode and G2 electrode shown in FIGS. 3A and 3B, as shown in FIGS. 3C and 3D.

Figure 4A:
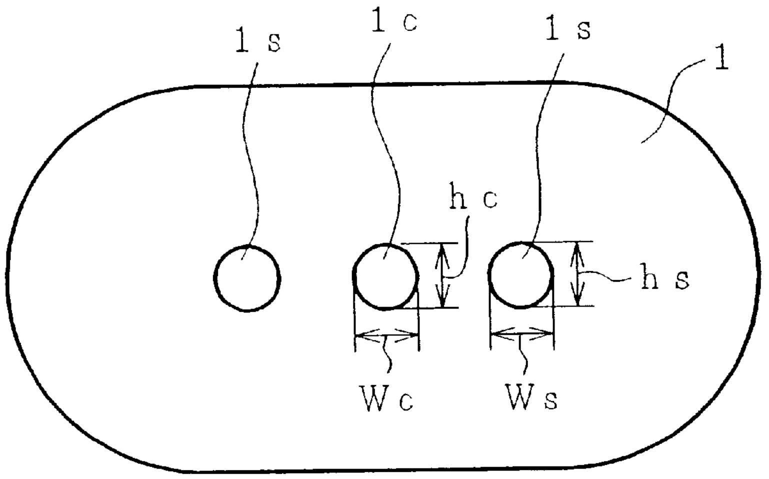
Figure 4B:
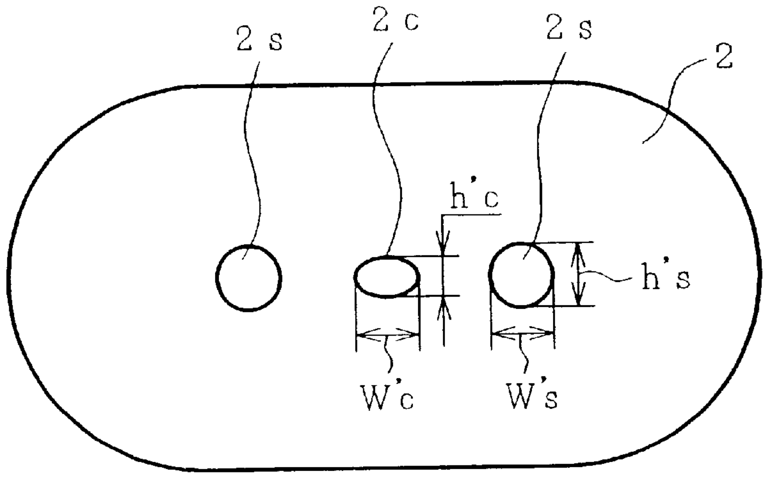

FIGS. 4A and 4B are views illustrating a second example of the sizes of electron beam apertures in the G1 electrode 1 and the G2 electrode 2 of an in-line electron gun used for the color cathode ray tube of the present invention, wherein FIG. 4A is for the G1 electrode 1, and FIG. 4B is for the G2 electrode 2.

The G1 electrode 1 shown in FIG. 4A has three in-line electron beam apertures 1*s* (a side electron beam aperture for blue), 1*c* (a center electron beam aperture for green), and 1*s* (a side electron beam aperture for red). Each of these apertures is formed in the same circular shape of the same size (wc=ws and hc=hs).

On the contrary, each of the side electron beam apertures (for blue and red) 2*s*, 2*s* is formed in the same circular shape of the same size (w's=h's), and the center electron beam aperture 2*c* (for green) is formed in an elliptic shape having the major axis, length w'c in the in-line direction which is the same as the length w's of the side electron beam aperture in the in-line direction and having the minor axis length h'c in the direction perpendicular to the in-line direction which is smaller than the length h's of the side electron beam aperture in the same direction (w'c=w's and h'c<h's).

The focusing characteristics shown in FIGS. 1A, 1B or FIGS. 2A, 2B can be obtained by forming the electron beam apertures in the G1 and G2 electrodes as described above.

Figure 4C:
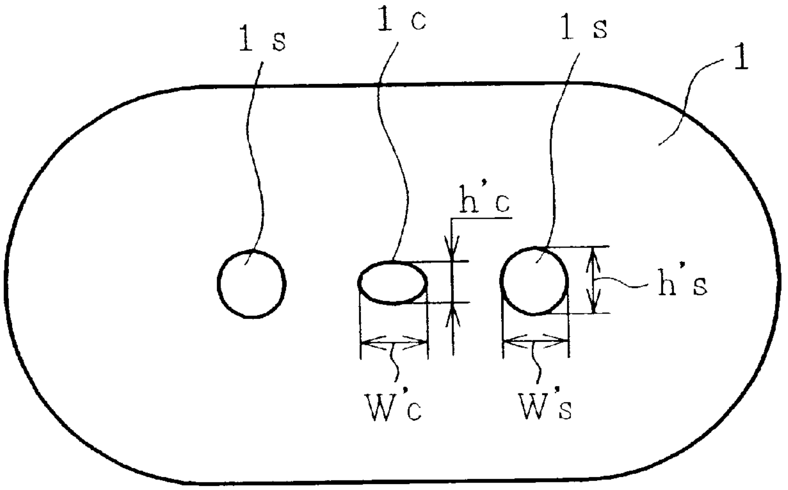
FIGS. 4C and 4D are views, similar to FIGS. 4A and 4B, illustrating an example in which the relationship of the shapes of electron beam apertures shown in FIGS. 4A and 4B is reversed.
Figure 4D:
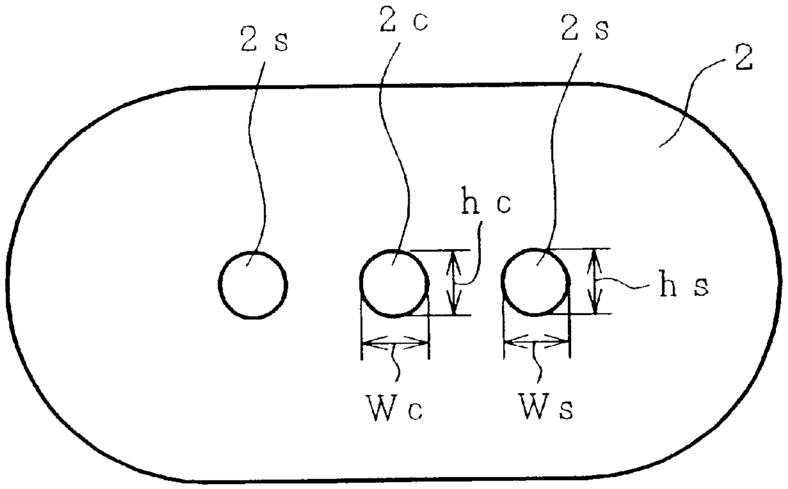

In addition, the same effect can be obtained by reversing the relationship between the G1 electrode and G2 electrode shown in FIGS. 4A and 4B, as shown in FIGS. 4C and 4D.

Figure 5A:
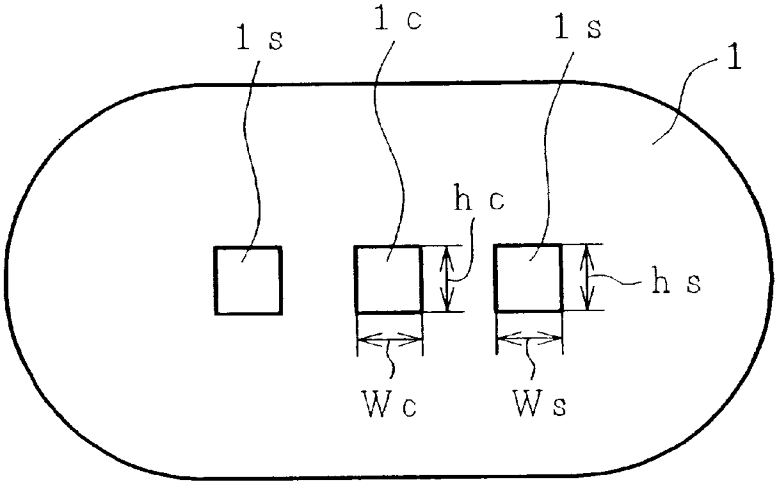
Figure 5B:
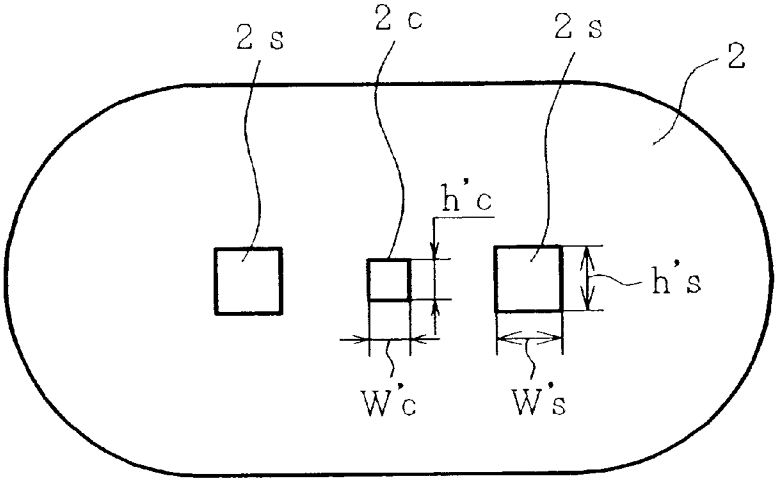

FIGS. 5A and 5B are views illustrating a third example of the shapes of electron beam apertures in the G1 electrode 1 and the G2 electrode 2 of an in-line electron gun used for the color cathode ray tube of the present invention, wherein FIG. 5A is for the G1 electrode 1, and FIG. 5B is for the G2 electrode 2.

In the G1 electrode 1 shown in FIG. 5A, the length wc of the center electron beam aperture 1*c* (for green) in the in-line direction is equal to the length ws of the side electron beam aperture 1*s* (for red or blue) in the in-line direction (wc=ws), and the length hc of the center electron beam aperture 1*c* in the direction perpendicular to the in-line direction is equal to the length hs of the side electron beam aperture 1*s* in the direction perpendicular to the in-line direction (hc=hs) However, in the center electron beam aperture 1*c*, the length hc in the direction perpendicular to the in-line direction is larger than the length wc in the in-line direction (hc<wc).

On the contrary, in the G2 electrode 2 shown in FIG. 5B, in-line three electron beam apertures 2*s* (a side electron beam aperture for blue), 2*c* (a center electron beam aperture for green), and 2*s* (a side electron beam aperture for red) are formed in such rectangular shapes as to satisfy the relationship of w'c<w's, and h'c<h's.

The focusing characteristics shown in FIGS. 1A, 1B or FIGS. 2A, 2B can be obtained by forming the electron beam apertures in the G1 and G2 electrodes as described above.

Figure 5C:
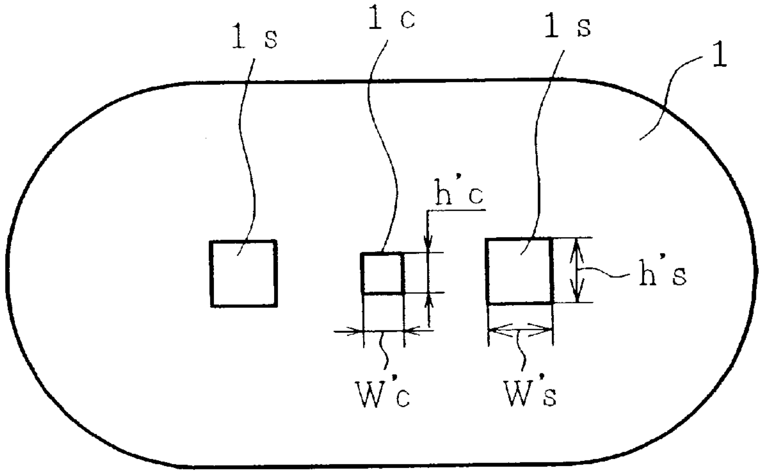
FIGS. 5C and 5D are views, similar to FIGS. 5A and 5B, illustrating an example in which the relationship of the shapes of electron beam apertures shown in FIGS. 5A and 5B is reversed.
Figure 5D:
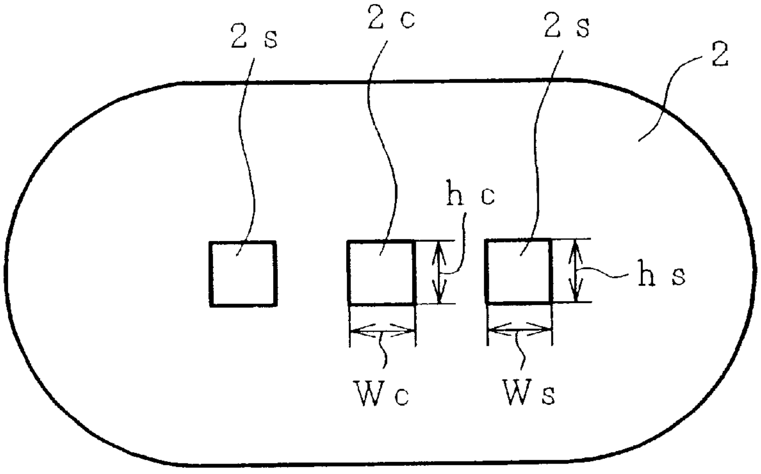

In addition, the same effect can be obtained by reversing the relationship between the G1 electrode and G2 electrode shown in FIGS. 5A and 5B, as shown in FIGS. 5C and 5D.

Figure 6A:
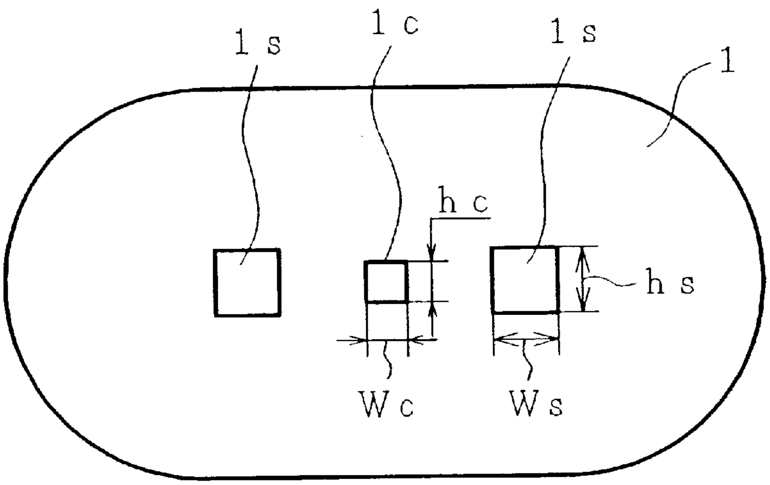
Figure 6B:
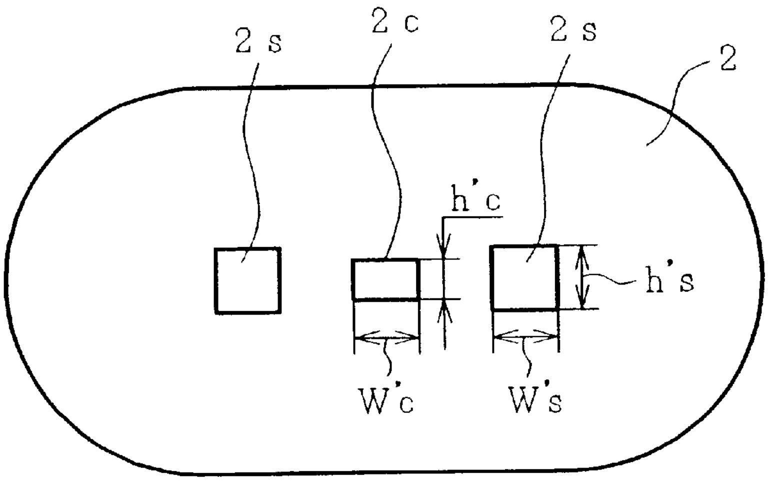

FIGS. 6A and 6B are views illustrating a fourth example of the shapes of electron beam apertures in the G1 electrode 1 and the G2 electrode 2 of an in-line electron gun used for the color cathode ray tube of the present invention, wherein FIG. 6A is for the G1 electrode 1, and FIG. 6B is for the G2 electrode 2.

In the G1 electrode 1 shown in FIG. 6A, the center electron beam aperture 1*c* (green) and the side electron beam apertures 1*s* (red and blue) are formed in such rectangular shapes as to satisfy the relationship of wc<ws and hc<hs. In this relationship, wc and ws indicate the lengths of the center and side electron beam apertures 1*c* and 1*s* in the in-line direction, and hc and hs are the lengths of the center and side electron beam apertures 1*c* and 1*s* in the direction perpendicular to the in-line direction.

On the contrary, in the G2 electrode 2 shown in FIG. 6B, three in-line electron beam apertures 2*s* (a side electron beam aperture for blue), 2*c* (a center electron beam aperture for green), and 2*s* (a side electron beam aperture for red) are formed in such rectangular shapes as to satisfy the relationship of w'c=w's, h'c<h's, and h's<w's.

The focusing characteristics shown in FIGS. 1A, 1B or FIGS. 2A, 2B can be obtained by forming the electron beam apertures in the G1 and G2 electrodes as described above.

Figure 6C:
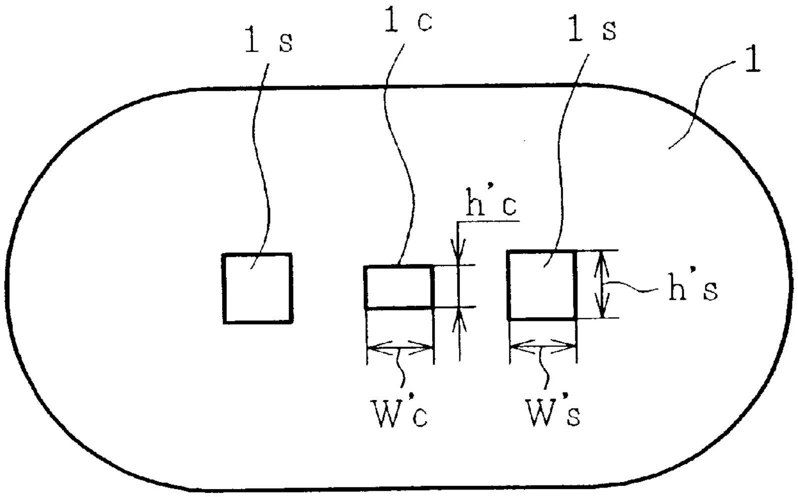
FIGS. 6C and 6D are views, similar to FIGS. 6A and 6B, illustrating an example in which the relationship of the shapes of electron beam apertures shown in FIGS. 6A and 6B is reversed.
Figure 6D:
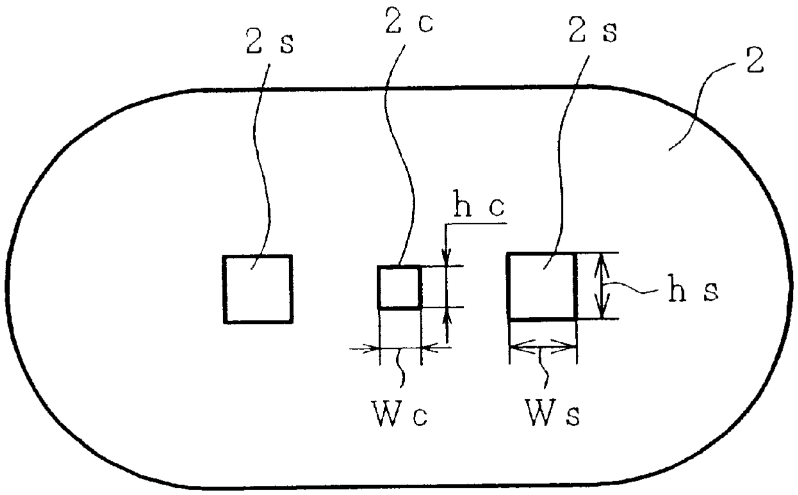

In addition, the same effect can be obtained by reversing the relationship between the G1 electrode and G2 electrode shown in FIGS. 6A and 6B, as shown in FIGS. 6C and 6D.

A difference in size is provided between the center electron beam aperture and the side electron beam aperture in the above embodiments, and the center electron beam aperture is preferably smaller than the side electron beam aperture by 5–30% in linear measure (a length or a diameter), or 5–51% in area.

Figure 7A:
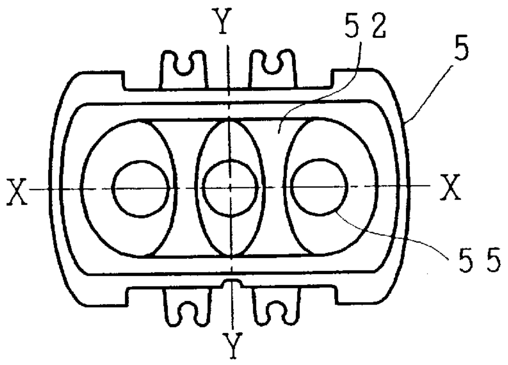
Figure 7B:
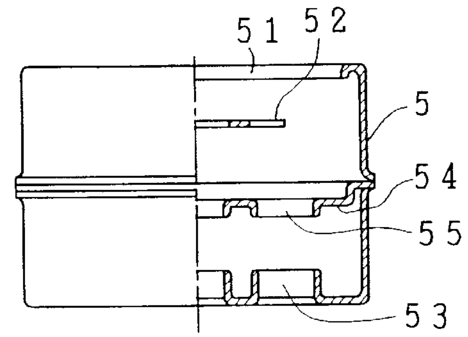

FIG. 7A and 7B are views illustrating one configuration example of one electrode 5 constituting a main lens-forming electrodes of an in-line electron gun used for the color cathode ray tube of the present invention, wherein FIG. 7A is a front view of the electrode, and FIG. 7B is a partial cutaway side view of the electrode. In FIGS. 7A and 7B, electron beams enter the three in-line electron beam apertures 53, passing through electron beam apertures 55 in the electrode and through an electric field correction electrode 52, and leave the portion 51 facing the main lens.

In the electron gun, the characteristics thereof are improved as the diameter of a main lens becomes larger. In the case of an in-line three-beam electron gun for a color cathode ray tube, the maximum diameter of each main lens is a third of the inside diameter of a neck portion of the cathode ray tube. A beam spacing S between adjacent electron beams in the electron gun is chosen on the basis of the design requirements for the purity of a color produced by the electron beam and beam convergence on phosphor screen.

Since the accuracy of the color purity conflicts with the accuracy of the beam convergence, the beam spacing S cannot be freely set. The diameter of a main lens for each of three in-line electron beams cannot be a third of the inside diameter of the neck portion of the cathode ray tube, and the actual beam spacing S is smaller than a third of the inside diameter of the neck portion.

The diameter of the main lens cannot be physically made larger than a third of the inside diameter of the neck portion, and accordingly, in the electrode shown in FIGS. 7A, 7B, the electric fields of the main lenses are made partially in common for three electron beams, and the potential distribution along the tube axis is suitably adjusted, to form the electric fields for increasing the effective diameter of each main lens, thereby improving the focus characteristics. However, in practice, it is very difficult to equalize the characteristic of the main lens for the center electron beam to that of the main lens for the side electron beam. In the example shown in FIGS. 7A and 7B, the main lens for the center electron beam is smaller in effective diameter than the main lens for the side electron beams, and spherical aberration is larger in the main lens for the center electron beam. As a result, in the conventional in-line electron gun, the diameter of the beam spot formed on the phosphor screen 24 by the center electron is larger than the diameter of the spot formed on the phosphor screen 24 by the side electron beams, resulting in the degradation of resolution of the center electron gun.

Figure 8A:
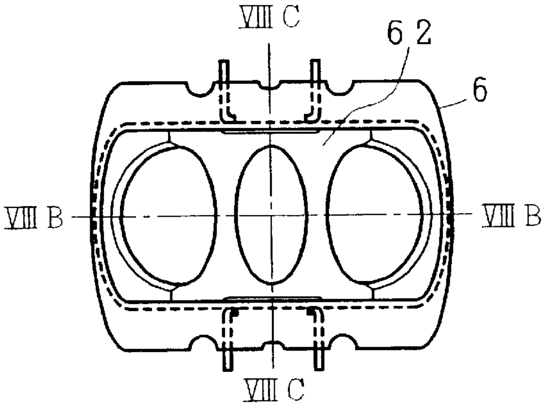
Figure 8C:
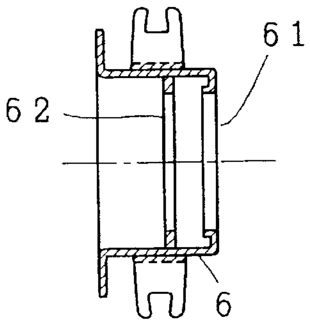
Figure 8B:
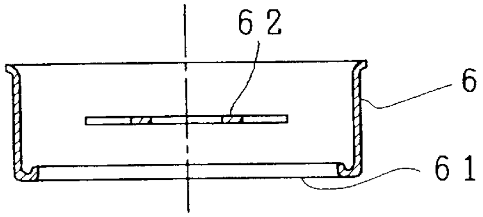

FIGS. 8A to 8C are views illustrating a configuration example of the other electrode 6 of the main lens forming electrodes to be assembled with the electrode 5 shown in FIGS. 7A and 7B, wherein FIG. 8A is a front view of the electrode, FIG. 8B is a sectional view taken on line VIIIB—VIIIB of FIG. 8A; and FIG. SC is a sectional view taken on line VIIIC—VIIIC of FIG. 8A.

These main lens-forming electrodes are used for the uni-potential or bi-potential hybrid type in-line electron gun described with reference to FIG. 13A, and the facing ends of the G5 electrode 5 shown in FIGS. 7A and 7B and the G6 electrode 6 shown in FIGS. 8A to 8C form main lens electric fields.

In FIGS. 7A and 7B, the inner electrode 52 serving as an electric field correction electrode in the G5 electrode has a vertically elongated aperture for the center electron beam, and side edges for forming electron beam apertures for the side electron beams in cooperation with the inner wall of the G5 electrode 5.The reason why the side electron beam apertures are different in shape from the center electron beam aperture is to enlarge the diameter of each main lens restricted by the beam spacing S in terms of the electric field.

Reference numeral 51 indicates a single opening in the G5 electrode on the G6 electrode side thereof, 53 is an electron beam aperture in the G5 electrode on the G4 electrode side thereof, 54 is an inner electrode, and 55 is an electron beam aperture in the inner electrode 54.

As shown in FIGS. 8A to 8C, an inner electrode 62 similar to that in the G5 electrode is provided in the G6 electrode, and in the G6 electrode, the center electron beam aperture is different in shape from the side electron beam apertures.

Reference numeral 61 indicates a single opening in the G6 electrode on the G5 electrode side thereof, and VIIIB and VIIIB is the in-line direction.

Figure 13A:
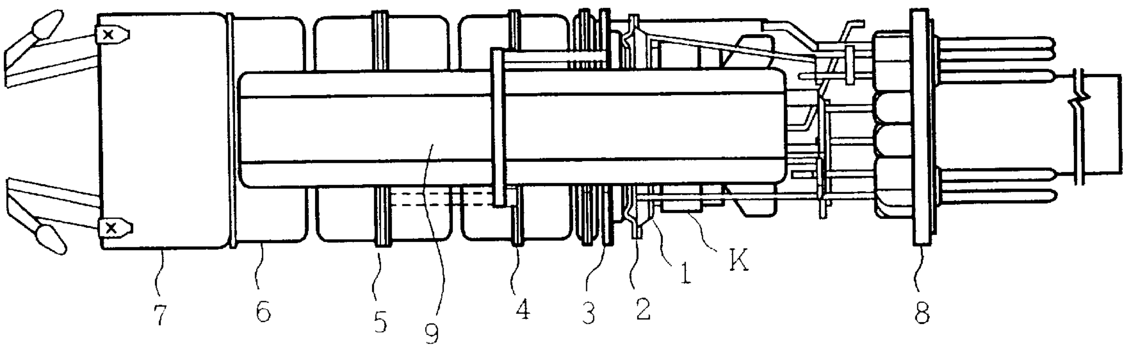
FIGS. 13A and 13B are schematic side views illustrating configuration examples of uni-potential type and bi-potential type in-line electron guns to be incorporated in the color cathode ray tube shown in FIG. 12, respectively.
Figure 13B:
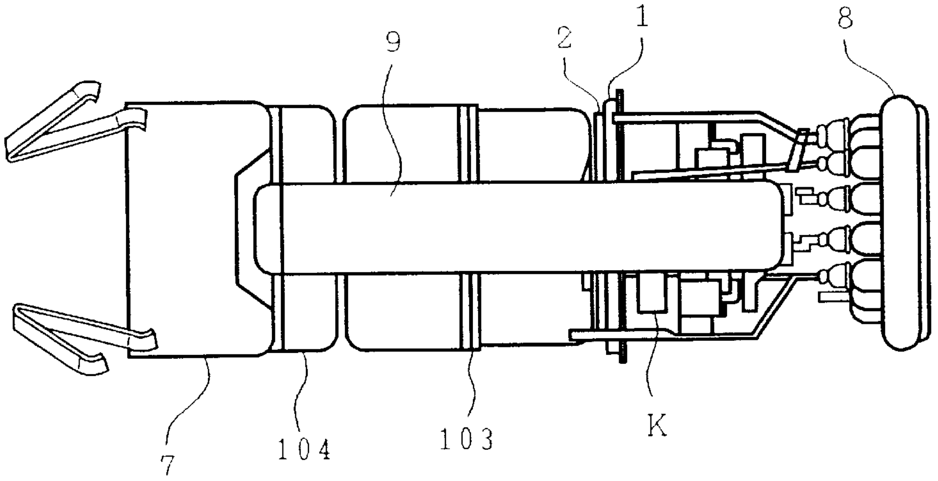

The above main lens-forming electrodes are in the in-line electron gun of the hybrid type shown in FIG. 13A, and they can also be used as the main lens-forming electrodes composed of the G3 electrode 103 and the G4 electrode 104, of the in-line electron gun of the type shown in FIG. 13B.

The focusing characteristics shown in FIGS. 1A, 1B or FIGS. 2A, 2B can be obtained by the use of such a main lens-forming electrodes.

Figure 9A:
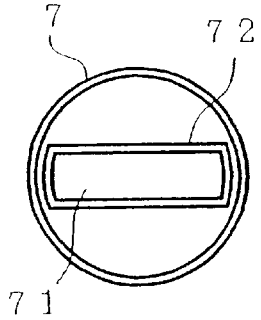
FIG. 9A shows a front view and FIG. 9B shows a sectional side view illustrating a configuration example of a shield cup of an in-line electron gun used for the color cathode ray tube of the present invention.
Figure 9B:
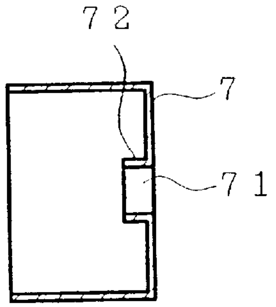
Figure 9C:
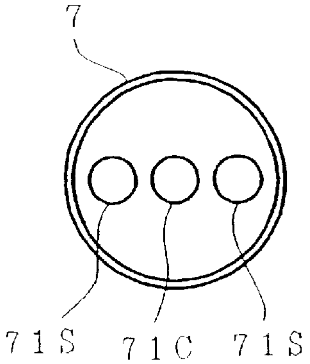
FIG. 9C shows a front view and FIG. 9D a sectional side view illustrating another configuration example of the shield cup of an in-line electron gun used for the color cathode ray tube of the present invention.
Figure 9D:
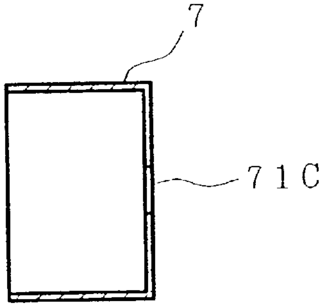

FIGS. 9A, 9B and 9C, 9D show configuration examples of shield cups of an in-line electron gun usable for the color cathode ray tube of the present invention, wherein FIGS. 9A, 9B show a shield cup 7 including a single aperture common to three electron beams, and FIGS. 9C, 9D show a shield cup 7 including apertures 71*s*, 71*c*, 71*s* through which three electron beams pass, respectively.

These shield cups 7 are fixed to the final electrode (anode) of the in-line electron gun, for example, the G6 electrode 6 in FIG. 13A or the G4 electrode 104 in FIG. 13B in such a manner as to have a potential equal to that of the final electrode.

In particular, the use of the shield cup 7 shown in FIGS. 9A, 9B is effective to further improve the characteristics of the electron gun.

One advantage of such a shield cup is to enable automatic correction for deflection aberration at each position on the screen in synchronization with the deflection for the fixed focus voltage. The shield cup is oriented such that the long side of the electron beam aperture 71 is in parallel to the in-line beam direction. In a color cathode ray tube, the shield cup 7 is mounted adjacent to the main lens and nearest the phosphor screen among the electrodes of the electron gun, and it is supplied with an anode voltage and is located in the deflection magnetic field. Accordingly, the electric field of the main lens penetrates into the vicinity of the electron beam aperture 71, and produces a non-uniform electric field for diverging the electron beam in the direction perpendicular to the beam in-line direction.

As is well known, in an in-line three-beam color cathode ray tube, a barrel-shaped vertical deflection magnetic field and a pin-cushion-shaped horizontal magnetic field are used for simplifying a beam convergence circuit. The vertical deflection magnetic field deflects electron beams and the at the same time it focuses them in the vertical direction, so that, when they are vertically deflected, the electron beams are vertically focused before reaching the phosphor screen, to produce a halo on the phosphor screen, thereby degrading the resolution of the cathode ray tube.

The electron beam in the vicinity of the electron beam aperture 71 is slightly deflected upward or downward from the center axis of the electron gun by the vertical deflection magnetic field, so that the electric field for providing the diverging action on the electron beam differs between the upper and lower side of the electron beam. For example, in the case where the electron beam is deflected upward on the screen, the diverging action exerted on the upper portion of the electron beam is stronger than that exerted on the lower portion of the electron beam, and it increases rapidly with deflection of the electron beam. The above focusing action on the electron beam due to the vertical deflection magnetic field is canceled by the diverging action, to suppress occurrence of the halo, thereby improving the resolution at the top and the bottom of the screen. By provision of peripherally inturned projections 72 above and below the electron beam aperture 71, it is possible to make longer the time during which the electron beam experiences the non-uniform electric field, and hence to increase the effect for suppressing a halo.

Another advantage of the shield cup is to relax the electric field in each main lens and hence to enlarge the effective diameter of the main lens. Since the conventional shield cup shown in FIG. 9B has three small circular apertures, the portions around these circular apertures obstruct the penetration of the electric fields of the main lenses toward the phosphor screen. On the contrary, in the shield cup shown in FIGS. 9A, 9B having no partition between three electron beams, the electric fields penetrate in the horizontal direction, to relax the electric fields, thereby increasing the effective diameters of the main lenses in the horizontal direction. of course, by increasing the vertical diameter of the electron beam aperture 71, it is possible to increase the effective vertical diameters of the main lenses.

By the use of the electron gun having the above-described electrode structure, there can be obtained a color cathode ray tube improved in resolution by enhancing focus characteristics over the entire region of the phosphor screen and over the entire electron beam current region.

As described above, in the electron gun having a plurality of electrodes according to the present invention, facing electron beam apertures in the electrodes are different in size from each other. For example, the size of the center electron beam aperture in the G2 electrode is smaller than the size of the corresponding electron beam aperture in the G1 electrode. Accordingly, the electrodes cannot be precisely assembled using a conventional assembling jig having pins to be inserted in respective electron beam apertures in the electrodes.

Figure 10:
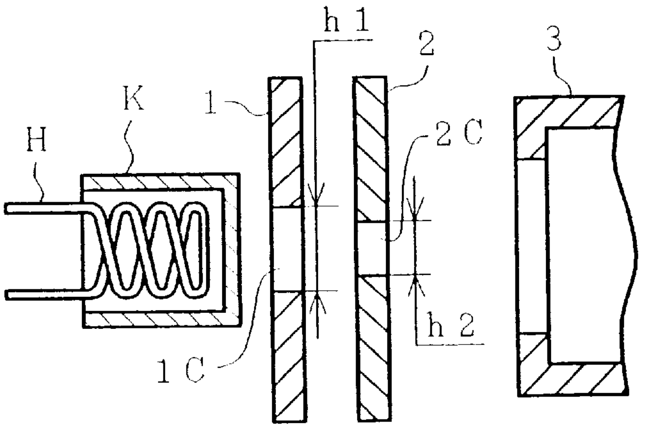
FIG. 10 is a schematic view illustrating an example in which the facing electron beam apertures of a plurality of electrodes arranged along the tube axis are different in size from each other.

FIG. 10 is a schematic view illustrating an example in which the center electron beam apertures of a plurality of electrodes arranged along the axial direction are different in size from each other. in this figure, reference numeral 1 indicates a G1 electrode; 2 is a G2 electrode; 3 is a G3 electrode; K is a cathode; and H is a heater. In FIG. 10, a diameter h2 of an electron beam aperture 2*c* positioned at the center in the G2 electrode 2 is smaller than a diameter h1 of an electron beam aperture IC positioned at the center in the G1 electrode 1.

Figure 11:
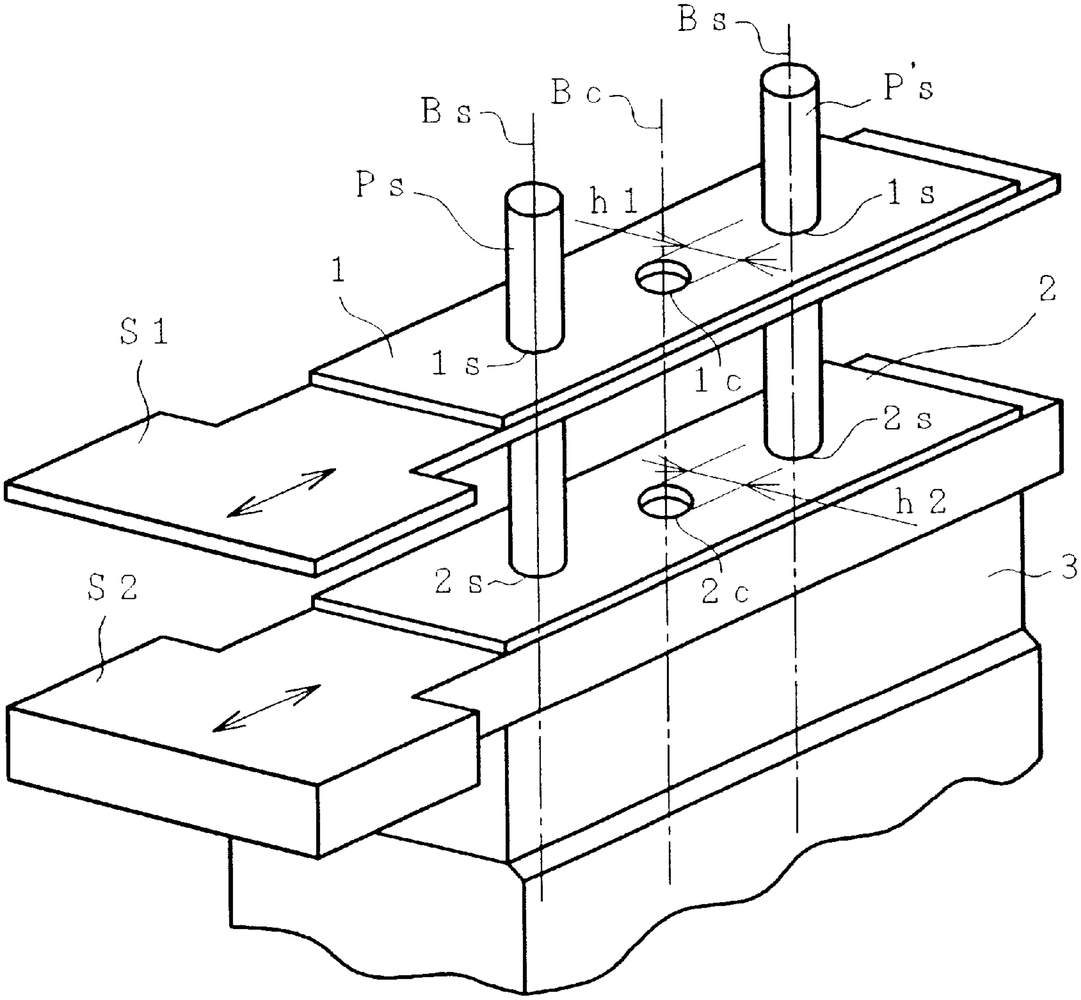
FIG. 11 is a perspective view illustrating assembling of an in-line electron gun having the electrodes shown in FIG. 10.
Figure 12:
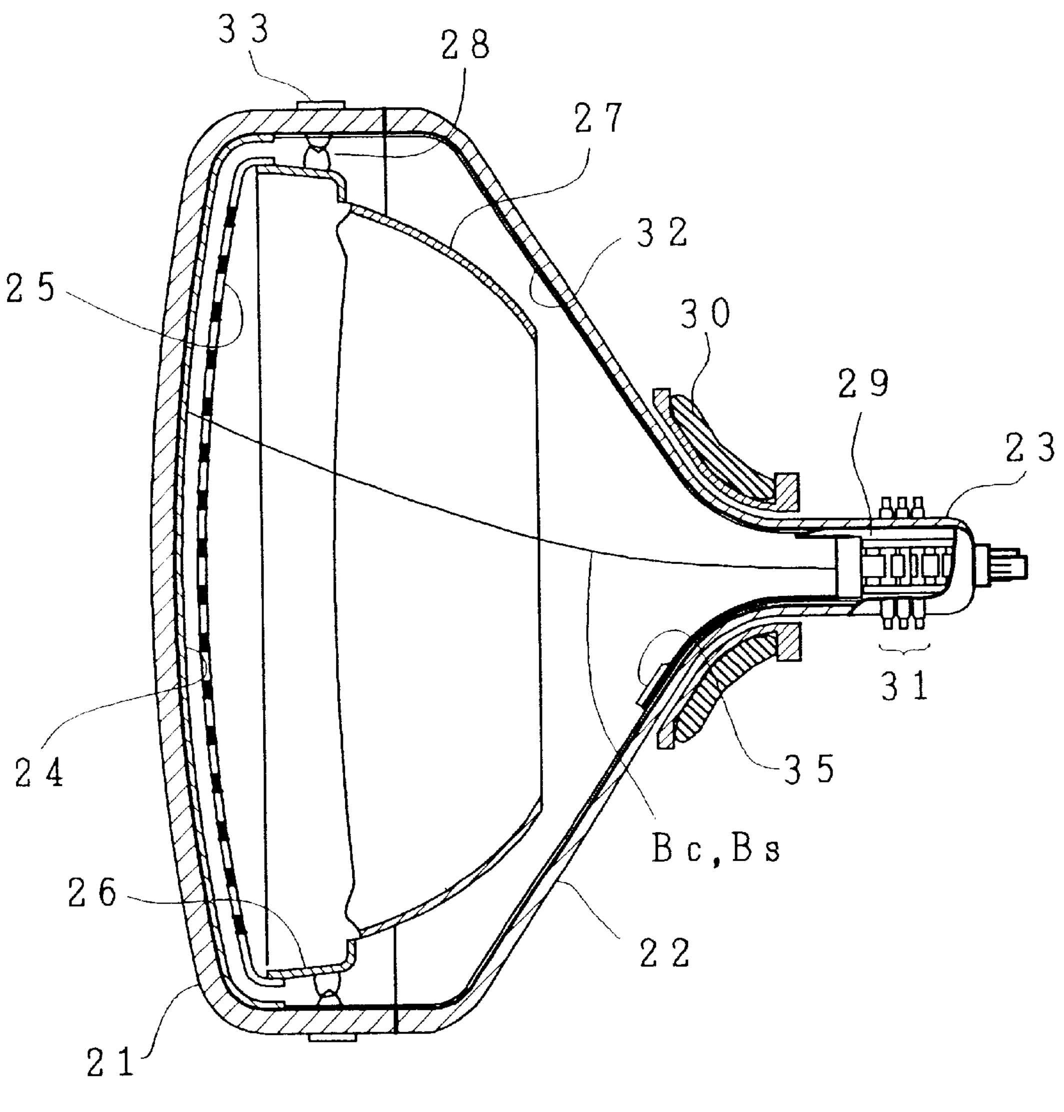
FIG. 12 is a sectional view illustrating a structure example of the color cathode ray tube of the present invention.

FIG. 11 is a perspective view illustrating assembling of the in-line electron gun having the electrodes shown in FIG. 10. Parts corresponding to those in FIG. 10 are indicated by the same characters, and character S1 indicates a spacer for the G1 electrode; S2 is a spacer for the G2 electrode; Ps is a pin; Bs is the center line of the side electron beam aperture; and Bc is the center line of the center electron beam aperture.

The spacers S1, S2 are provided with slits (not shown) formed in parallel to the in-line direction of the electron beam apertures so as to be inserted or removed in the direction of the arrows.

As shown in FIG. 11, the assembling jig of the in-line electron gun has only a pair of the pins Ps and Ps to be inserted into the side electron beam apertures 1S, 1S, 2S, 2S, . . . , positioned at both sides of the G1 electrode 1, G2 electrode, . . . , and has no pins to be inserted into the center electron beam apertures 1*c*, 2*c*, . . . , positioned at the centers of the electrodes.

The in-line electron gun including the electrodes having the opposing electron beam apertures different from each other in size can be accurately assembled using such an assembling jig.

What is claimed is:

1. A color cathode ray tube comprising:

an electron gun composed of a plurality of electrodes including a cathode, a first grid electrode, and a second grid electrode arranged in this order forming a pre-focus lens for generating and focusing three in-line electron beams, and a pair of electrodes disposed down stream of said pre-focus lens and forming a final main lens, each of said pair of electrodes having a common single opening for said three in-line electron beams in an end thereof opposing another of said pair of electrodes, and each of said pair of electrodes having therein another electrode set back from said end thereof opposing another of said pair of electrodes, said another electrode being provided with openings for each of said three in-line electron beams, a member of each of said pair of electrodes formed with said common single opening and said another electrode being separate parts and assembled in unity;

a shield cup fixed to a final electrode of said electron gun and having applied thereto the same potential which is applied to said final electrode, said shield cup having a single aperture common to said three in-line electron beams;

a deflection device for deflecting said three in-line electron beams in horizontal and vertical directions;

a phosphor screen made luminescent by impingement thereon of said three in-line electron beams;

wherein a focusing action of said pre-focus lens and a focusing action of said main lens are different between a center electron beam and a side electron beam of said three in-line electron beams, respectively.

2. A color cathode ray tube according to claim 1, wherein said single aperture of said shield cup has a larger dimension in said in-line direction than a dimension transverse to said in-line direction.

3. A color cathode ray tube according to claim 2, wherein the area of an aperture for said center electron beam in said second grid electrode is different from the area of an aperture for said center electron beam in said first grid electrode.

4. A color cathode ray tube according to claim 3, wherein the area of said aperture for said center electron beam in said second grid electrode is smaller than the area of said aperture for said center electron beam in said first grid electrode.

5. A color cathode ray tube according to claim 2, wherein the area of an aperture for said side electron beam in said first grid electrode is the same as the area of an aperture for a corresponding side electron beam in said second grid electrode.

6. A color cathode ray tube comprising:

an electronic gun composed of a plurality of electrodes including a cathode, a first grid electrode, and a second grid electrode arranged in this order forming a pre-focus lens for generating and focusing three in-line electron beams, and a pair of electrodes disposed down stream of said pre-focus lens and forming a final main lens, each of said pair of electrodes having a single opening common to said three in-line electron beams in an end thereof opposing another of said pair of electrodes;

a shield cup fixed to a final electrode of said electron gun and having applied thereto the same potential which is applied to said final electrode, said shield cup having a single aperture common to said three in-line electron beams;

a deflection device for deflecting said three in-line electron beams in horizontal and vertical directions, a phosphor screen made luminescent by impingement thereon of said three in-line electron beams;

wherein a focusing action of said pre-focus lens and a focusing action of said main lens are different between a center electron beam and a side electron beam of said three in-line election beams, respectively.

7. A color cathode ray tube according to claim 6, wherein said single aperture of said shield cup has a larger dimension in said in-line direction than a dimension transverse to said in-line direction.

8. A color cathode ray tube according to claim 7, wherein the area of an aperture for said center electron beam in said second grid electrode is different from the area of an aperture for said center electron beam in said first grid electrode.

9. A color cathode ray tube according to claim 8, wherein the area of said aperture for said center electron beam in said second grid electrode is smaller than the area of said aperture for said center electron beam in said first grid electrode.

10. A color cathode ray tube according to claim 7, wherein the area of an aperture for said side electron beam in said first grid electrode is the same as the area of an aperture for a corresponding side electron beam in said second grid electrode.

11. A color cathode ray tube comprising;

an electron gun composed of a plurality of electrodes including a cathode, a first grid electrode, and a second grid electrode arranged in this order forming a pre-focus lens for generating and focusing three in-line electron beams, and a pair of electrodes disposed down stream of said pre-focus lens and forming a final main lens, each of said pair of electrodes having a single opening common to said three in-line electron beams in an end thereof opposing another of said pair of electrodes;

a shield cup fixed to a final electrode of said electron gun and having applied thereto the same potential which is applied to said final electrode, said shield cup having a single aperture common to said three electron beams;

a deflection device for deflecting said three in-line electron beams in horizontal and vertical directions;

a phosphor screen made luminescent by impingement thereon of said three in-line electron beams;

wherein an effective lens diameter of said main lens is different between a center electron beam and a side electron beam of said three in-line electron beams, and a focusing action of said pre-focus lens is different between said center electron beam and said side electron beam.

12. A color cathode ray tube according to claim 11, wherein said single aperture of said shield cup has a larger dimension in said in-line direction than a dimension transverse to said in-line direction.

13. A color cathode ray tube according to claim 12, wherein the area of an aperture for said center electron beam in said second grid electrode is different from the area of an aperture for said center electron beam in said first grid electrode.

14. A color cathode ray tube according to claim 13, wherein the area of said aperture for said center electron beam in said second grid electrode is smaller than the area of said aperture for said center electron beam in said first grid electrode.

15. A color cathode ray tube according to claim 12, wherein the area of an aperture for said side electron beam in said first grid electrode is the same as the area of an aperture for a corresponding side electron beam in said second grid electrode.

16. A color cathode ray tube comprising:

an electron gun composed of a plurality of electrodes including a cathode, a first grid electrode, and a second grid electrode arranged in this order forming a pre-focus lens for generating and focusing three in-line electron beams, and a pair of electrodes disposed downstream of said pre-focus lens and forming a final main lens, each of said pair of electrodes having a single opening common to said three in-line electron beams in an end thereof opposing another of said pair of electrodes;

a shield cup fixed to a final electrode of said electron gun and having applied thereto the same potential which is applied to the final electrode, said shield cup having a single aperture common to said three electron beams;

a deflection device for deflecting said three in-line electron beams in horizontal and vertical directions;

a phosphor screen made luminescent by impingement thereon of said three in-line electron beams;

wherein a lens diameter for a center electron beam of said three in-line electron beams in said main lens is smaller than a lens diameter for a side electron beam of said three in-line electron beams in said main lens, and a focusing action of said pre-focus lens is different between said center electron beam and said side electron beam.

17. A color cathode ray tube according to claim 16, wherein said single aperture of said shield cup has a larger dimension in said in-line direction than a dimension to said in-line direction.

18. A color cathode ray tube according to claim 17, wherein the area of an aperture for said center electron beam in said second grid electrode is different from the area of an aperture for said center electron beam in said first grid electrode.

19. A color cathode ray tube according to claim 18, wherein the area of said aperture for said center electron beam in said second grid electrode is smaller than the area of said aperture for said center electron beam in said first grid electrode.

20. A color cathode ray tube according to claim 17, wherein the area of an aperture for said side electron beam in said first grid electrode is the same as the area of an aperture for a corresponding side electron beam in said second grid electrode.

* * * * *